(No Model.)
C. A. FRENCH.
GAME APPARATUS.
No. 592,087. Patented Oct. 19, 1897.
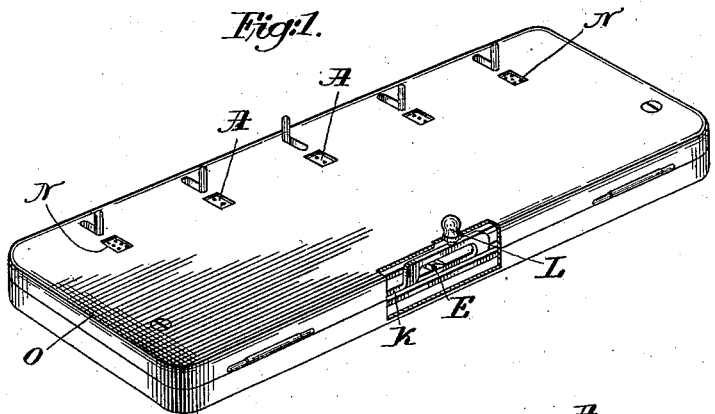
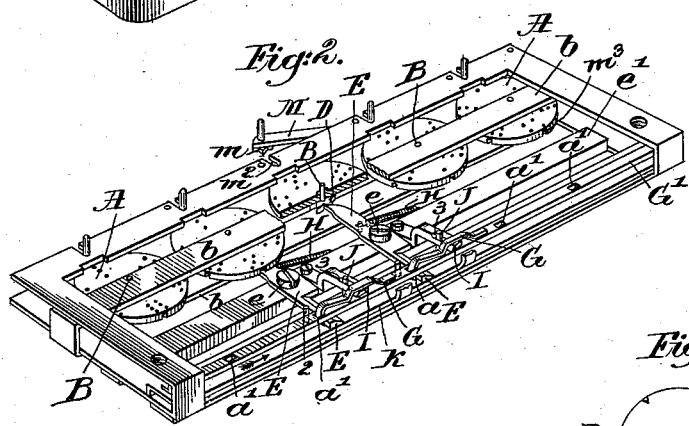
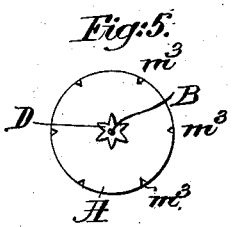
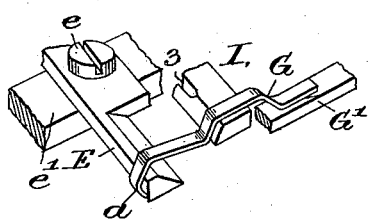
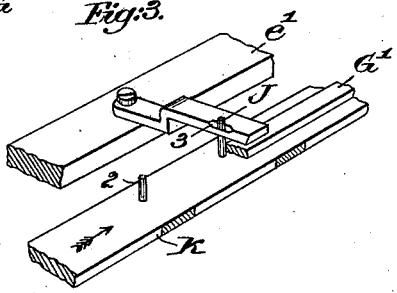
Witnesses.
A. C. Harmon
Thomas J. Drummond
Inventor:
Charles A. French,
by Crosby & Gregory
Attys

United States Patent Office.

CHARLES A. FRENCH, OF BOSTON, MASSACHUSETTS.

GAME APPARATUS.

SPECIFICATION forming part of Letters Patent No. 592,087, dated October 19, 1897.

Application filed July 20, 1894. Serial No. 518,102. (No model.)

*To all whom it may concern:*

Be it known that I, CHARLES A. FRENCH, of Boston, county of Suffolk, State of Massachusetts, have invented an Improvement in Game Apparatus, of which the following description, in connection with the accompanying drawings, is a specification, like letters and figures on the drawings representing like parts.

This invention has for its object the production of a novel game apparatus.

The chief constituent of the apparatus is a device intended to bring into view or indicate one of a series of characters or symbols, and in the present instance such indicator is shown in the form of a disk carrying the series of characters or symbols common to dice; but the characters or symbols may be figures or words, and yet be within the scope of my invention. The character-carrier, adapted to be spun or rotated rapidly about a center, has connected to it a toothed wheel, with which is combined a spring-actuated finger, said finger, when moved in one direction by an actuating device, being adapted to engage said toothed wheel, and through it position one or the other of the characters or symbols of the character-carrier to show, through a suitable sight-opening made in part of a case or cover inclosing the apparatus, the movement of the finger to position the character-carrier, also changing the abnormal condition of the actuating-spring, so that said spring, when the finger is released from the control of a holder which holds it in place after it has been moved far enough to position the character-carrier, may act quickly to move the finger and cause it, in contact with said toothed wheel, to spin or rotate rapidly the character-carrier. The character-carrier and toothed wheel, for the best results, are attached to a spindle, stepped at its opposite ends, so that the carriers may rotate rapidly until caught and held, which is effected by bringing the finger in engagement with the toothed wheel, there being a notch in said wheel for each character. The character-carriers will preferably be arranged in series, and the fingers for the different carriers will be moved by one and the same actuator when the character-carriers are to be positioned. I have combined with each disk a suitable locking device, whereby any one or more character-carriers may be kept from being rotated while other character-carriers are to be set in motion by their fingers and springs, or, in other words, when the character-carriers or disks are arranged in series they may all be spun or rotated simultaneously, or one or more of them may be rotated, leaving other character-carriers of the series at rest, and all the moving character-carriers or disks may be stopped simultaneously and collectively.

Figure 1 shows a game apparatus embodying my invention in one form. Fig. 2 shows the apparatus removed from the inclosing case, the uppermost pillar-plate being broken out and one of the character-carriers being in section to show the toothed wheel under it, the devices for operating some of the character-carriers being omitted owing to their being only duplicates of those already shown. Figs. 3 and 4 show some of the parts enlarged, and Fig. 5 shows the under side of a character-carrier and the toothed wheel.

The character-carrier A, represented as a disk, is shown as provided with a series of characters or symbols such as commonly found on the faces of dice, but instead of said characters, I may use figures, words, or other symbols according to the game to be played. Each character-carrier or disk, whatever the number used, has operatively connected with it a toothed wheel D, both having a common center, shown as a spindle B, stepped in usual manner in pillar-plates *b b* above and below the disks and suitably sustained by and constituting part of the framework shown in Fig. 2, said framework being of suitable shape to sustain the working parts, to be described, but this invention is not limited to the particular shape of the disk, or to the particular plan shown for mounting it and the toothed wheel, so that it may be rotated rapidly and freely. Each character-carrier has coöperating with it a suitable finger or flipper E, herein shown as a metallic arm, pivoted at *e* on a suitable bed or bar *e'*, connected to or forming part of the framework, said finger having connected to it a suitable actuating-spring H, which is put into abnormal position by moving the finger in a direction to cause its end next the toothed wheel D to engage said toothed wheel and position the disk A to correctly show one of its symbols or characters through a sight-opening, as N, in a suitable inclosing case or box O, which may be of any suitable material or shape to accommodate one or a series of character-carriers and devices to move the same, the wheel D having a notch or tooth for each character or group of carriers or symbols—as, for instance, in the present instance six notches. (See Fig. 5.)

To move the finger or flipper in opposition to spring H that it may coöperate with a toothed wheel and position a character-carrier or disk prior to spinning or rotating it, and also to stop the rotation of the disk, I employ an actuating device, herein shown as a slide K, suitably supported in the framework, and provided with a handpiece L by which to move it in the desired direction, said slide having, as shown, a pin or projection 2 to act against said finger when the slide is moved in the direction of the arrow on it in Figs. 2 and 3. The finger having been moved to position the character-carrier and also put the spring H in its abnormal position, said finger must be held until it is desired to release it and let the spring H give it a quick movement, at which time the end of the finger in engagement with the toothed wheel gives to the latter a sharp blow or jerk, causing the character-carrier to be spun or rotated rapidly. The holding device G is herein shown as a spring connected to a bar G′, located above the slide K, said holder having its free end $a$ turned down through a hole $a'$ in said bar and below slide K, said end $a$ snapping behind the farther side of the beveled outer end of the finger and holding the same in the position in which it is left by the action of the pin or projection 2, as described. (See Fig. 4.) Now to release the finger and let the spring H assume control of it, I have, as herein shown, provided a releasing device I, represented as a lever or arm pivoted on the bar $e'$, and having a slot 3, which is entered by a pin or projection J on the slide K. The end of said releasing device, when the finger is in engagement with a toothed wheel to position a disk, occupies a position in the open space below the holding device, as shown in Fig. 2, and to move the holder to release the finger the bar K will be moved in a direction opposite the arrow in Figs. 2 and 3, the pin 2 at such time moving away from the finger, so as not to be in its way when the spring H is to act, and the said pin 2 being out of the way to leave play room for the finger the end of the releasing device meets the cam-surface of the finger-holder and lifts it, so that its free end $a$ passes away from the finger, letting the spring H turn it to spin the disk, the outer end of the lever preferably being arrested by a suitable projection on the slide K. The character-carriers so actuated quickly by the spring would run until their momentum was overcome, and should they stop of their own accord the characters would not be correctly displayed at the sight-openings N, but by or through the toothed wheel D, it performing the function of a registering device, it is possible to regulate each character at the sight-opening. As soon as the character-carriers have been spun, and while they are running rapidly, the actuating device K may be again moved in the direction of the arrow, causing only the finger or fingers which have just been actuated by the spring or springs to be moved in the direction to engage the toothed wheels or registering devices D, and position a character of the disk opposite a sight-opening, this being done simultaneously with all the disks used, so that they all come to rest positively and at the same instant.

The user of the game apparatus may, when the disks have been positioned, as described, render any one or more disks inoperative by or through the employment of a locking device coöperating with each character-carrier, said locking device, in this present embodiment of my invention, being shown as a lever M, having a toe $m$ adapted to enter a notch $m^2$ in the frame and engage a notch $m^3$ in the edge of the disk, but instead of the particular locking device shown I may employ any other suitable locking device to effect the positive locking out of operation of any desired disk or disks of the series, so that it may be held at rest while other disks are being spun.

This invention is not limited in all instances to engaging the disk directly to lock it out of use, as the desired result could be effected by engaging and holding any part actually to be moved before the disk could be spun by the spring H resuming its normal condition.

This invention is not limited to the exact shape shown for the finger or flipper to engage and give a quick spin to the disks, nor to the exact shape shown for the holding device, nor to the exact shape shown for the releasing device, nor to the actuating device for moving the fingers or flippers, so long as said fingers or flippers are supported each independently of the others, so that one or more of them may be actuated to effect the spinning or rotation of the character-carrier and leave others at rest, and on the return movement of the actuating device for the fingers, all those fingers, and only those which are released to spin a character-carrier, will be simultaneously moved to positively engage and position each its own character-carrier. The fingers or flippers and their connected springs constitute the movers for the character-carriers when to be spun, and they also constitute, when moved in the opposite direction, positioning devices, and when a character-carrier is to be locked out of operation, the finger or flipper retains such position with relation to the toothed wheel D as to spin a disk whenever a finger or flipper is released. I deem it important that each finger or flipper have an independent spring, for (irrespective of the necessity of its use with a locking device) the use of independent springs will allow of the different carriers being given varying speeds by increasing or diminishing the power of the various springs with respect to each other.

If the game apparatus has a series of character-carriers, and the game is to obtain the highest numbers in, say, three trials, the person first to try will spin, say, all of the disks, and will then catch them by means of the fingers, and position all the characters at the sight-openings. The person will then lock out of operation any one or more disks having satisfactory characters or symbols exposed at the sight-openings, and will spin the remaining number of disks and position them as before, locking out of operation such additional number of disks as may make a satisfactory showing, and then spin the disks not so locked out, and again catch and position them.

An amusing game may be played by providing the character-carriers with words and obliging the person spinning the disks to at once compose a sentence using the words exposed at the sight-openings.

Another way of using the apparatus would be for each of two or more players to choose separate disks, and after the disks have been set in motion each player closes in the locking device of his disk, and the one whose disk shows the highest number to be considered the winner; or the same style of game may be played with a single disk and its accompanying parts, and each player operate the disk and locking device in succession.

Having described my invention, what I claim, and desire to secure by Letters Patent, is—

1. A game apparatus, comprehending a case having suitable sight-openings, a series of character-carriers provided with a series of characters or symbols, mechanism adapted when moved in one direction to effect the spinning or rotation of all or any number of said carriers simultaneously, and when moved in the opposite direction to positively stop the rotation of and position the carriers then in motion to show a character or symbol on each at said sight-openings, and means for preventing the revolution of any number of said carriers while the others are moving, substantially as described.

2. A series of disks, each having a series of numbers or symbols and working on an easily-revoluble spindle, means for preventing the rotation of any number of such disks, and mechanism arranged to revolve all disks simultaneously or any number of them less than all, and to stop all of the revolving disks simultaneously with a symbol or number of each disk opposite to a predetermined reading-point, substantially as described.

3. A game apparatus containing the following instrumentalities, viz: a case having suitable sight-openings; a series of character-carriers each provided with a series of characters or symbols and a toothed wheel, and a series of fingers or flippers to engage said toothed wheels, combined with an actuating device to move said fingers or flippers in one direction to position the character-carriers, and independent springs to move said fingers or flippers independently of each other in the direction to spin or rotate said character-carriers, substantially as described.

4. A series of rotatable character-carriers having a series of characters or symbols, a toothed wheel for each carrier, means for locking any number of said carriers, a series of independent spring-actuated fingers or flippers, and a holding device to hold them in engagement with the toothed wheels to hold the character-carriers at rest, combined with a means for placing the springs actuating the fingers under tension and a releasing device to cause the holders to release the fingers or flippers in order that the coöperating springs may act and effect the movement of the said fingers or flippers and spin or rotate the character-carriers, substantially as described.

5. In a game apparatus, a series of character-carriers having a series of characters or symbols adapted to be displayed at a proper sight-opening, and toothed wheels coöperating with said carriers, combined with a series of independent pivoted fingers, one for each carrier, an independent spring for each finger and an actuating device common to all said fingers, which, when moved in one direction will move all said fingers to cause them to engage the toothed wheels and position the character-carriers, substantially as described.

6. In a game apparatus, a series of character-carriers having a series of characters or symbols adapted to be displayed at a proper sight-opening, and toothed wheels coöperating with said carriers, combined with a series of independent pivoted fingers, one for each carrier; an independent spring for each finger; an actuating device common to all said fingers, which, when moved in one direction will move all said carriers to cause them to engage the toothed wheels and position the character-carriers; and a series of holding devices to lock said fingers in place to hold the character-carriers in registered position, substantially as described.

7. In a game apparatus, a series of character-carriers having a series of characters or symbols adapted to be displayed at a proper sight-opening, a locking device for each carrier and toothed wheels coöperating with said carriers, combined with a series of independent, pivoted, spring-controlled fingers, one for each carrier; an actuating device common to all said fingers, which, when moved in one direction will move all said fingers to cause them to engage the toothed wheels and position the character-carriers; a series of holding devices to lock said fingers in place to hold the character-carriers in registered position; and a releasing device for each of said holding devices, substantially as described.

8. In a game apparatus, a case having a series of sight-openings; a series of character-carriers and attached toothed wheels; a series of spring-controlled fingers or flippers operating independently of each other through independent springs to effect the positioning of said character-carriers to display their characters or symbols at said sight-openings, combined with a series of locking devices, one for each character-carrier by which to lock out of operation any one of said character-carriers while other character-carriers are being spun or rotated, substantially as described.

In testimony whereof I have signed my name to this specification in the presence of two subscribing witnesses.

CHARLES A. FRENCH.

Witnesses:
CHARLES N. CLARK,
GEORGE A. ELDER.